US009948777B2

(12) United States Patent
Ghuli et al.

(10) Patent No.: US 9,948,777 B2
(45) Date of Patent: Apr. 17, 2018

(54) ROUTING AND NOTIFICATION IN RESPONSE TO A FAILED FORKED CALL

(71) Applicant: Avaya Inc., Santa Clara, CA (US)

(72) Inventors: Basavraj Ghuli, Pune (IN); Dinesh Mude, Pune (IN)

(73) Assignee: Avaya Inc., Santa Clara, CA (US)

(*) Notice: Subject to any disclaimer, the term of this patent is extended or adjusted under 35 U.S.C. 154(b) by 48 days.

(21) Appl. No.: 14/702,849

(22) Filed: May 4, 2015

(65) Prior Publication Data

US 2016/0330320 A1 Nov. 10, 2016

(51) Int. Cl.
*H04L 12/28* (2006.01)
*H04Q 11/00* (2006.01)
*H04M 3/46* (2006.01)
*H04M 3/02* (2006.01)

(52) U.S. Cl.
CPC .............. *H04M 3/465* (2013.01); *H04M 3/02* (2013.01)

(58) Field of Classification Search
CPC . H04L 65/1006; H04L 65/1046; H04L 69/40; H04L 29/06285; H04M 3/465; H04M 3/42102; H04M 3/42365
See application file for complete search history.

(56) References Cited

U.S. PATENT DOCUMENTS

| 6,608,893 B1* | 8/2003 | Fleming | H04Q 3/0029 370/217 |
| 2007/0206568 A1* | 9/2007 | Silver | H04L 12/66 370/352 |
| 2008/0270618 A1* | 10/2008 | Rosenberg | H04L 65/1069 709/228 |
| 2012/0202474 A1* | 8/2012 | Gisby | H04M 3/4234 455/417 |
| 2016/0072955 A1* | 3/2016 | Barkan | H04M 3/42212 455/417 |
| 2016/0156783 A1* | 6/2016 | Mufti | H04L 29/06217 455/445 |

FOREIGN PATENT DOCUMENTS

| CA | 2540629 A1 * | 9/2006 | ....... H04L 29/06027 |
| WO | WO 2009097032 A1 * | 8/2009 | ............ H04M 3/465 |

* cited by examiner

*Primary Examiner* — Maharishi Khirodhar
(74) *Attorney, Agent, or Firm* — Sheridan Ross P.C.

(57) ABSTRACT

Call forking allows for a subscriber to receive an incoming call and have that call ring on a number of endpoints identified by the subscriber. The call may then be answered on any one of the endpoints without the calling party needing to know which device is most likely to be answered. Call forking is not always available, such as due to regulatory prohibition or technical issues. As a result, a call may be designated to be forked to a particular endpoint, but that particular endpoint may fail to receive the call. The called and calling parties are often unaware of the issue. However, by providing the address of the endpoint back to an originating server associated with the calling party, the call may be forked from the originating server via a path different from the one that caused the endpoint to be unreachable. Once the call is answered, on any ringing endpoint, all other forked calls are terminated.

20 Claims, 10 Drawing Sheets

ROUTING AND NOTIFICATION IN RESPONSE TO A FAILED FORKED CALL

FIELD OF THE DISCLOSURE

The present disclosure is generally directed toward telephony systems for handling a failed forked call.

BACKGROUND

Call forking allows a subscriber on a telephone system to have an incoming call ring two or more endpoints. Often a subscriber to a telephony system will receive an incoming call on a variety of devices and locations, such as a desk phone, home phone, cellular phone, soft phone, etc. The caller places a call to the subscriber, the call is forked by a server associated with the subscriber to ring the subscriber's designated endpoints. The subscriber may then answer the call on any of the endpoints receiving a call, which may or may not be the endpoint associated with the number called by the caller. However, it is not always possible to reach an endpoint designated to receive a forked call.

Forking limitations may cause one or more designated endpoints to be unreachable. An endpoint may be unreachable due to governmental rules. For example, India and other countries in the Asia-Pacific regions require the use of a public switched telephone network (PSTN) or otherwise impose technical limitations that prevent call forking. If a forked call cannot be completed to a particular endpoint, that endpoint does not ring and not all configured endpoints of the user will receive the call.

SUMMARY

It is with respect to the above issues and other problems that the embodiments presented herein were contemplated. A forked call may fail due to policy, restriction, or unavailable resources at the destination server. In one embodiment of the present disclosure, the originating server of a call that failed to reach an endpoint of a forked call will receive notification of the failure. In another embodiment, the originating server may take ownership of forking, at least with respect to the unreached endpoint, and attempt to reach the endpoint via another route that excludes the path causing the endpoint to be unreachable.

In call forking, if any of the endpoints (e.g., devices) associated with the forking is not reached due to a limitation, such as government policies, authorization, access, and/or network limitations, the call originator will not come to know that the call has not reached each endpoint. As the unreachable endpoint does not ring, if the subscriber is proximate only to the unreachable device, the subscriber is also unaware of the call and the endpoint being unreachable. However, in one embodiment of the present disclosure, the destination server passes the unreachable endpoint's address information to the originating server. The originating server then creates its own forked call, via a different routing algorithm, so that parallel simultaneous alerting can be provided on all the forked endpoints. After call forking, all identities for the endpoints will be synchronized with respect to the overall call state. For example, if all identities/endpoints are ringing and any one is used to answer the call, the other identities/endpoints will stop alerting and the call is connected to the answered identity/endpoint.

In one embodiment of the present disclosure, a system is disclosed, comprising: a destination server configured to manage communications between a network and a number of destination endpoints; a data storage device configured to maintain a call forking record associated with a subscriber of the destination server and identifying a plurality of destination endpoints to ring upon receiving a call for a designated one of the destination endpoints; wherein the destination server is further configured to, upon receiving the call, access the call forking record and in accord therewith create a plurality of forked calls to ring each of the plurality of destination endpoints and determine that at least one of the plurality of destination endpoints is an unreachable destination endpoint; and a messaging component configured to generate and send a notification to an originating server associated with the call and wherein the notification comprises an address of the unreachable destination endpoint.

In another embodiment of the present disclosure, a method is disclosed, comprising: accessing a call forking record associated with a subscriber of a destination server, the call forking record identifying a plurality of destination endpoints to ring upon receiving a call for a designated one of the destination endpoints; upon receiving the call, creating a plurality of forked calls to ring each of the plurality of destination endpoints; determining at least one of the plurality of destination endpoints is an unreachable destination endpoint; and in response to the determining step, generating and sending a notification to an originating server associated with the call and wherein the notification comprises an address of the unreachable destination endpoint.

In another embodiment of the present disclosure, a server is disclosed, comprising: a connection to a network and an originating endpoint; functionality configured to cause a call originating from the originating endpoint and designating a terminating endpoint to be forwarded to a destination server via the network and, in response to the forwarding, receiving an address associated with an unreachable endpoint of a plurality of endpoints designated as the target of a corresponding plurality of forked calls originating from the destination server; and a call interface configured to create a forked call to the address.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media.

Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
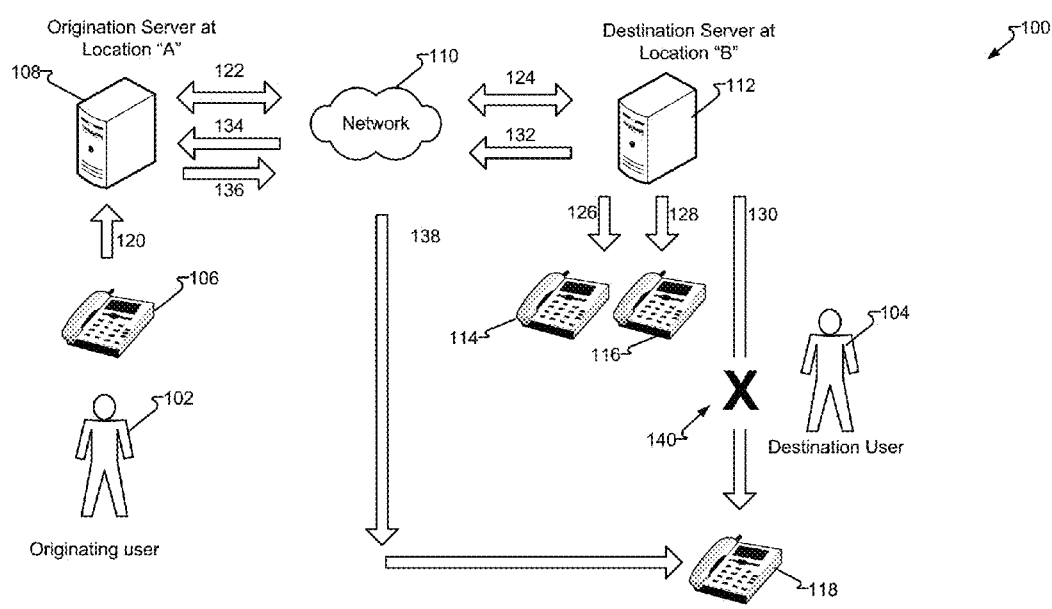
FIG. 1 depicts a communication system in accordance with embodiments of the present disclosure.

FIG. 1 depicts communication system 100 in accordance with embodiments of the present disclosure. In one embodiment of the present disclosure, originating user 102 places a call utilizing origination endpoint 106 to destination user 104. Originating user 102 may utilize a particular address (e.g. phone number, IP address, URI, etc.) for endpoints associated with destination user 104. Destination user 104 utilizes call forking so that the incoming call rings a plurality of devices, specifically destination endpoints 114, 116, 118. Originating user 102, origination endpoint 106, and originating server 108 at a first location may be unaware of the call forking instructions of destination server 112.

In should be appreciated that endpoints, as used herein, which may include one or more of origination endpoint (e.g., origination endpoint 106 and destination endpoint (e.g., destination endpoints 114, 116, 118) may comprise a physical endpoint (e.g., wired telephone, wireless (e.g., WiFi), cellular telephone, computer, or other communication device) as well as an identity, such as a computer, cellular telephone, or other device operating an application (e.g., softphone) to provide connectivity via an identity associated with the application, which may or may not be the same identity associated with the physical device.

Origination endpoint 106 initiates a call to originating server 108 at location A. Originating server 108 exchanges data 122 with network 110 which in turn communicates data 124 with destination server 112. Destination server 112 executes forking instructions to initiate forked calls 126, 128, 130 to a plurality of destination endpoints, such as endpoint 114, 116, 118, respectively. Endpoints receiving the forked calls may then begin to ring or otherwise alert the incoming call.

Destination endpoint 118 is unable to be reached via forked call 130. Obstacle 140 prevents forked call 130 from reaching endpoint 118 and preventing endpoint 118 from ringing. Obstacle 140 may be a policy, government rule, trunk exhaustion, or other mechanism that prevents forked call 130 from reaching endpoint 118—destination endpoint 118 thereby being unreachable endpoint 118. For example, in India call forking is required to utilize the PSTN due switch programming made in compliance with governmental rules. As a result, an Internet protocol (IP) based communication that wishes to utilize call forking is prohibited from reaching destination endpoint 118 via the Internet and, as described above, destination endpoint 118 would not receive the forked call. In another example, destination endpoint 118 may only be reachable from destination server 112 via a trunk or trunks that are currently fully utilized and, therefore, trunk capacity is unable to accommodate a forked call to reach endpoint 118.

While an endpoint may be reachable but unable to accept a forked call, such as due to an endpoint being busy/off-hook, unplugged, disabled, powered-off, or otherwise unavailable due to a condition other than being unreachable via a forked call, may be processed by other means. For example, destination user 104 is a subscriber to telephony services provided by destination server 112. Destination user 104 may configure their destination endpoints 114, 116, 118 to return "BUSY" if one or more of endpoints 114, 116, 118 are off-hook. Alternatively, destination user 104 may allow the non-busy endpoints to ring, which if unanswered, may be further forwarded to a voicemail application or another endpoint.

In one embodiment of the present disclosure, destination server 112 creates and sends message 132 via network 110 and it is received as message 134 by originating server 108, indicating destination endpoint 118 is an unreachable endpoint. Originating server 108 also receives an address (e.g., telephone number, IP address, universal resource indicator, etc.) for destination endpoint 118 via message 132, 134 or in another embodiment, via a separate message (not shown). Originating server 108 creates forked call 136 that is transmitted via network 110 to destination endpoint 118 via route 138 determined as a route that causes obstacle 140, in the route of forked call 130, to be omitted from the route path 138. Accordingly, endpoints 114, 116, 118 may then ring or otherwise provide an alert of the incoming call.

Figure 2:
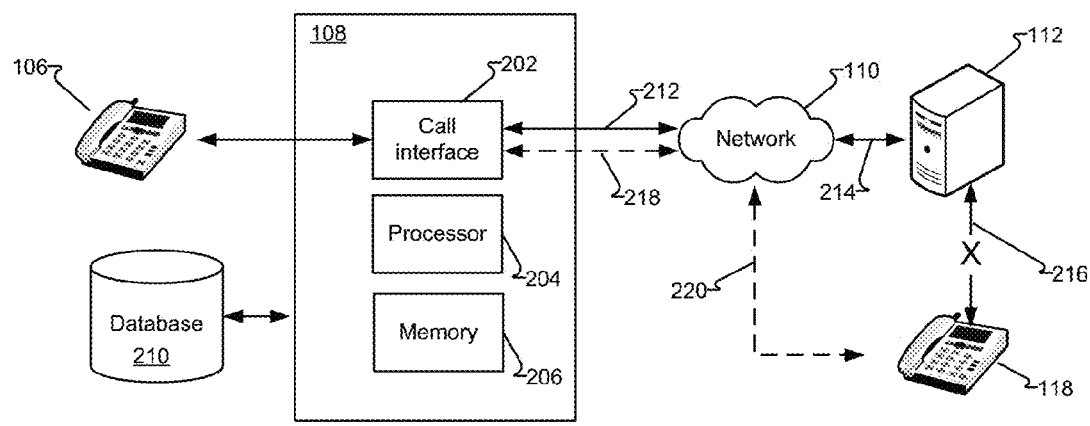
FIG. 2 depicts a server with a communication system in accordance with embodiments of the present disclosure.

FIG. 2 depicts origination server 108 in accordance with embodiments of the present disclosure. In one embodiment, origination server 108 is a component of communication system 100 (see FIG. 1). Origination server 108 may comprise a telephony interface for one or more endpoints. To avoid unnecessarily complicating the figure, only one origination endpoint 106 is provided. Origination endpoint 106 is associated with originating user 102 who places a call to destination user 104 (see FIG. 1).

Server 108 comprises call interface 202 and processor 204. Server 108 may comprise additional hardware and/or software to perform additional functions such as billing, maintaining a directory (e.g., LDAP), etc. Additionally, server 108 may comprise a number of physical devices (e.g., switches, blades, server farm, etc.) or be integrated into or with other processes, such as when sever 108 is a component of another processing device.

The call originating with origination endpoint 106 is received by server 108 at call interface 202. Processor 204, with access to data, such as within memory 206 and/or database 210. Database 210 may comprise internal and/or external storage accessible for read/write access by processor 204. Processor 204 then creates messages (e.g., INVITE, etc.) for transmission via network 110. The call-path initially utilizes connections 212, 214, and attempts to utilize connection 216 to reach destination endpoint 118 as a forked call. Also to avoid unnecessarily complicating the figure, destination endpoint 118 is illustrated alone however, it should be appreciated that additional endpoints (see FIG. 1) of which one or more may be reachable and/or one or more may be unreachable are also contemplated herein and may be provided without departing from the disclosure provided herein.

Destination server 112 is configured to signal origination server 108 that destination endpoint 118 is unreachable. The signal comprising an address of destination endpoint 118. Processor 204 then creates a forked call to destination endpoint 118 for transmission via connections 218, 220 and thereby avoiding connection 216. As a result destination endpoint 118, which is unreachable via destination server 112 may receive the forked call and ring or otherwise indicate the call and, optionally, be answered by destination user 104.

Figure 3:
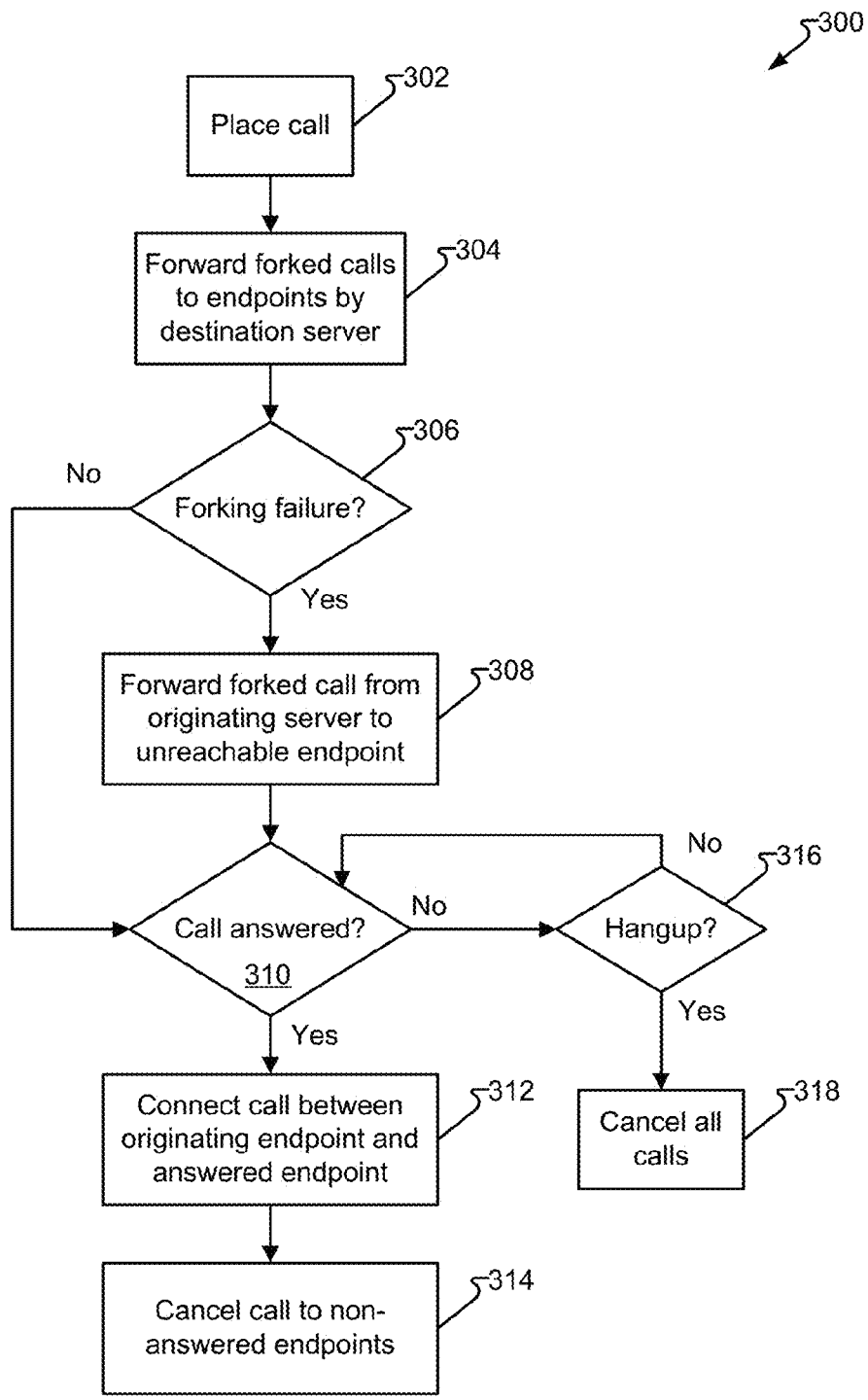
FIG. 3 depicts a first process in accordance with embodiments of the present disclosure.

FIG. 3 depicts first process 300 in accordance with embodiments of the present disclosure. In one embodiment, process 300 begins with step 302 placing a call. Step 302 may be performed by origination server 108 upon receiving an address (e.g., telephone number, URI, etc.) for a call placed by origination user 102 via origination endpoint 106. Step 304 forks the call at the destination server, such as destination server 112, in accord to configuration instructions provided thereto in order to ring a number of endpoints (e.g., endpoints 114, 116, 118).

Step 306 determines if there is a failure of at least one forked call. If no, step 306 may proceed to step 310. If yes, step 306 may proceed to step 308. Step 308 creates a forked call via a different pathway to avoid the reason for the failure determined by step 306. Processing then continues to step 310. Step 310 determines if the call has been answered. If no, step 316 determines if the calling party (e.g., originating user 102) has terminated the call prior to the call being answered. If no, step 316 may proceed back to step 310 to repeat steps 310 and/or step 316. If step 316 determines that a hang-up has occurred, process 300 continues to step 318 and all forked calls are cancelled.

If step 310 determines the call has been answered, processing continues to step 314 which cancels the call on all unanswered endpoints. The call may have been answered on an endpoint associated with a forked call from destination server 112 or an endpoint associated with a forked call from origination server 108. The message (e.g., CANCEL) is provided to each unanswered endpoint which may require the message to be sent from one or both of destination server 112 and origination server 108.

Figure 4:
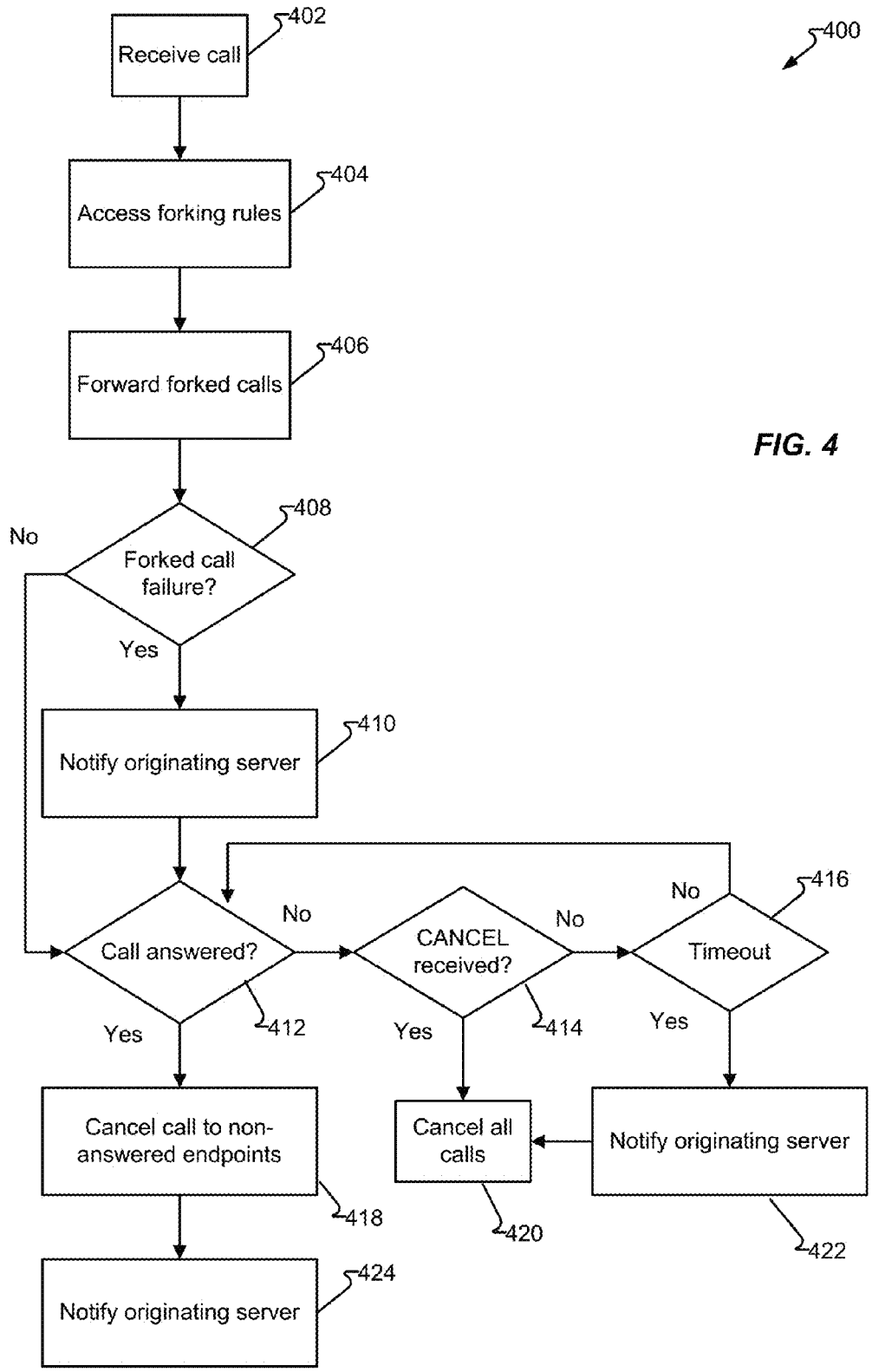
FIG. 4 depicts a second process in accordance with embodiments of the present disclosure.

FIG. 4 depicts second process 400 in accordance with embodiments of the present disclosure. In one embodiment, process 400 is directed to steps executed by destination server 112. In one embodiment, process 400 begins with step 402 receiving a call. The call may be received for destination user 104 who may be a subscriber of telephony services from an enterprise operating destination server 112. Next, step 404 accesses forking rules associated with the "to" address of the call received in step 402. Step 406 then creates forked calls for forwarding to the endpoints (e.g., endpoints 114, 116, 118) as defined by the forking rules of step 404.

Step 408 determines whether a forked call has failed. Failure may be determined as the reception of a particular error message (e.g., certain 4xx, 5xx, 6xx error messages or other messages associated with an unreachable endpoint) and/or absence of an acceptance message (e.g., "100 TRYING," ""200 OK"," "180 RINGING," etc.). Other specific error and acceptance messages defined under RFC 2543 or other specification may be utilized as an indicator of a forked call success or failure to reach the designated endpoint. If step 408 is determined in the negative, processing may continue to step 412. If step 408 is determined in the affirmative, processing may continue to step 410. Step 410 notifies originating server 108 of the failure, such as with an "UPDATE" message. The "UPDATE" message may be an informational message, a second updated message, and/or other message operable to inform the originating party of the failure. Step 410 may also include the address of unreachable endpoint 118. If step 410 does not include the address within the UPDATE message, the address may be provided to originating server 108 via another means, such a second message or other communication as may be previously negotiated between originating server 108 and destination server 112.

In another embodiment, following step 410, step 412 is performed to determine if the call has been answered. Step 412 may be determined by destination server 112 receiving a message (e.g., "200 OK") in response to a forked call. If step 412 is determined in the negative, processing may continue to step 414 which determines whether a cancellation (e.g., "CANCEL") message which may be associated with the answering of an endpoint from a forked call owned by origination server 108. Upon step 414 determining a cancellation message has been received, processing continues to step 420 to cancel all calls for which destination server 112 owns. If step 415 is determined in the negative, processing may continue to step 416 to determine if a timeout or event has occurred (e.g., "408 TIMEOUT"). If step 416 determines there is no timeout state, process 400 may continue back to step 412. If step 416 is determined in the affirmative, processing may continue to step 422, whereby originating server 108 is notified of the failure. Process 400 may then continue to step 420.

In other embodiment, step 412 is determinate in the affirmative. Process 400 then continues to step 418 whereby non-answered endpoints are sent a cancellation message (e.g., "CANCEL") to terminate the call or calls thereto. Next, step 424 notifies originating server that the call has been answered (e.g., "200 OK"). As will be described more completely with regard to the remaining figures, originating server 108 if presenting owning a forked call may then proceed to cancel such a call. If originating server 108 does not own any forked call, such as when step 408 was determined in the negative, originating server 108 may connect the call normally. If originating server 108 does own at least one forked call, step 424 then causes the cancellation of the owned forked calls.

Figure 5:
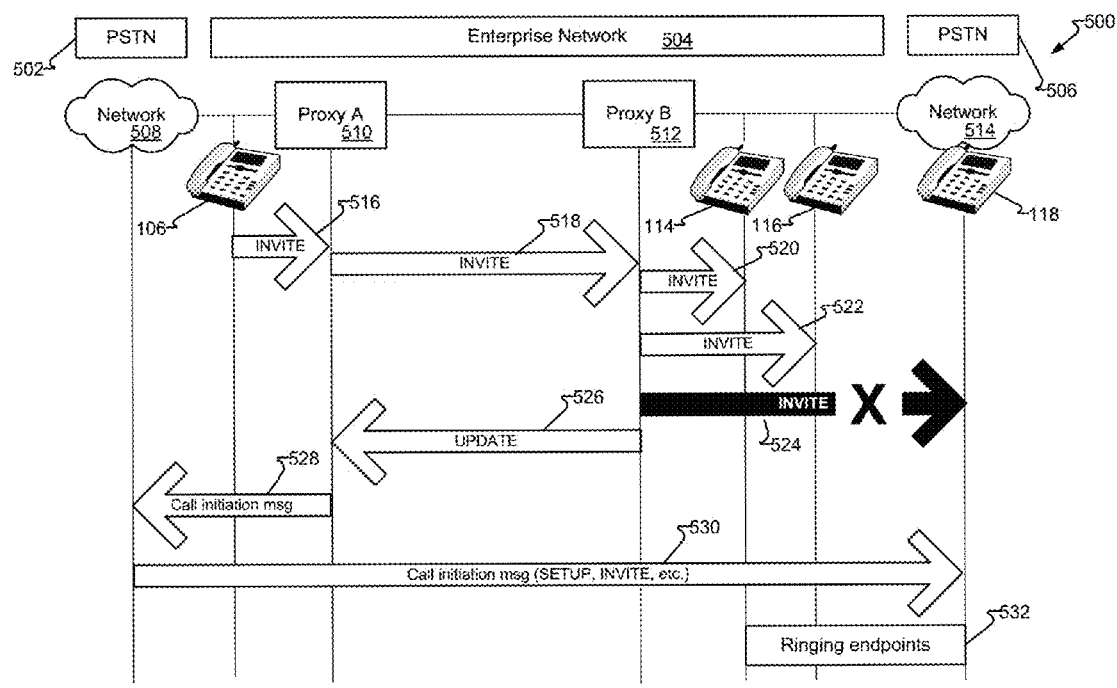
FIG. 5 depicts a first interaction in accordance with embodiments of the present disclosure.

FIG. 5 depicts interaction 500 in accordance with embodiments of the present disclosure. In one embodiment of the present disclosure, a communications network comprises PSTN 502, enterprise network 504, and PSTN 506. In another embodiment, PSTN 502 and PSTN 506 are the same PSTN. In another embodiment, endpoint 106 is associated with proxy A 510 that calls destination user 104, such as to cause an endpoint associated with destination user 104 to ring.

In one embodiment of the present disclosure, origination endpoint 106 sends invite 516 to proxy A 510. Proxy A 510 then sends invite 518 to proxy B 512. Proxy B 512 sends invite to destination endpoint 114 via invite 520 and to destination endpoint 116 via invite 522. Proxy B 512 sends invite 524 to destination endpoint 118, such as on PSTN 506; however, destination endpoint 118 is unreachable. Proxy B 512 then sends update message 526 to proxy A 510 and proxy A 510 sends call initiation message 528 to network 508 in response thereto. Update messages 526, 528 include the address of unreachable endpoint 118. In another embodiment, the address of unreachable endpoint 118 is provided to network 508 via a separate message or mechanism. Network 508, such as PSTN 502, then sends call initiation message 530 via network 514 to destination endpoint 118 at which time endpoint 114, 116, 118 are ringing at step 532.

Figure 6:
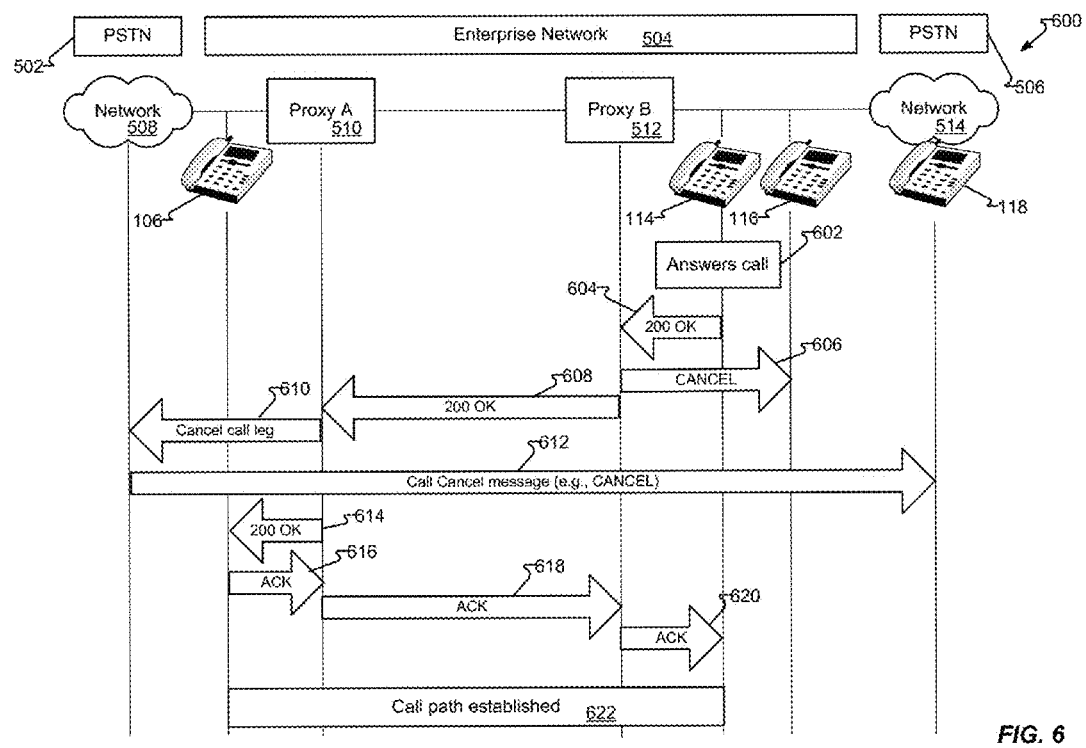
FIG. 6 depicts a second interaction in accordance with embodiments of the present disclosure.

FIG. 6 depicts interaction 600 in accordance with embodiments of the present disclosure. In one embodiment of the present disclosure, endpoints 114, 116, 118 are ringing and one of the endpoints (e.g. endpoint 114) associated with a forked call from a destination server or Proxy B 512 answers the call. Network 508 and/or Proxy A 512 then proceeds to cancel the forked call, such as set up by call path 138 (See FIG. 1).

The specific messages provided are variously embodied. In one embodiment of the present disclosure destination endpoint 114 answers the call 602 such as a result of INVITE message 516, 518, 520 (see FIG. 5). Message 604 acknowledges the answering of the call, such as via "200 OK". Proxy B 512 receives message 604 and proceeds to cancel the invite, such as INVITE message 522 (see FIG. 5), via cancel message 606. Message 608 is also an acknowledgment that the call has been answered in step 602, such as "200 OK". Proxy A 510 receives message 608 and initiates cancellation of the call to endpoint 118.

Network 508, such as in response to message 610, sends cancelation message 612 (e.g., CANCEL) to network 514 thereby causing INVITE message, such as invite message 524 (see FIG. 5) to be terminated. Proxy A 510 also sends message 614 (e.g., "200 OK") to origination endpoint 106, which responds with acknowledgement message 616 (e.g., ACK). Proxy A 510, in turn, sends ACK message 618 to proxy B 512, which in turn sends ACK message 620 to destination endpoint 114. As a result, call path 622 is established.

Figure 7:
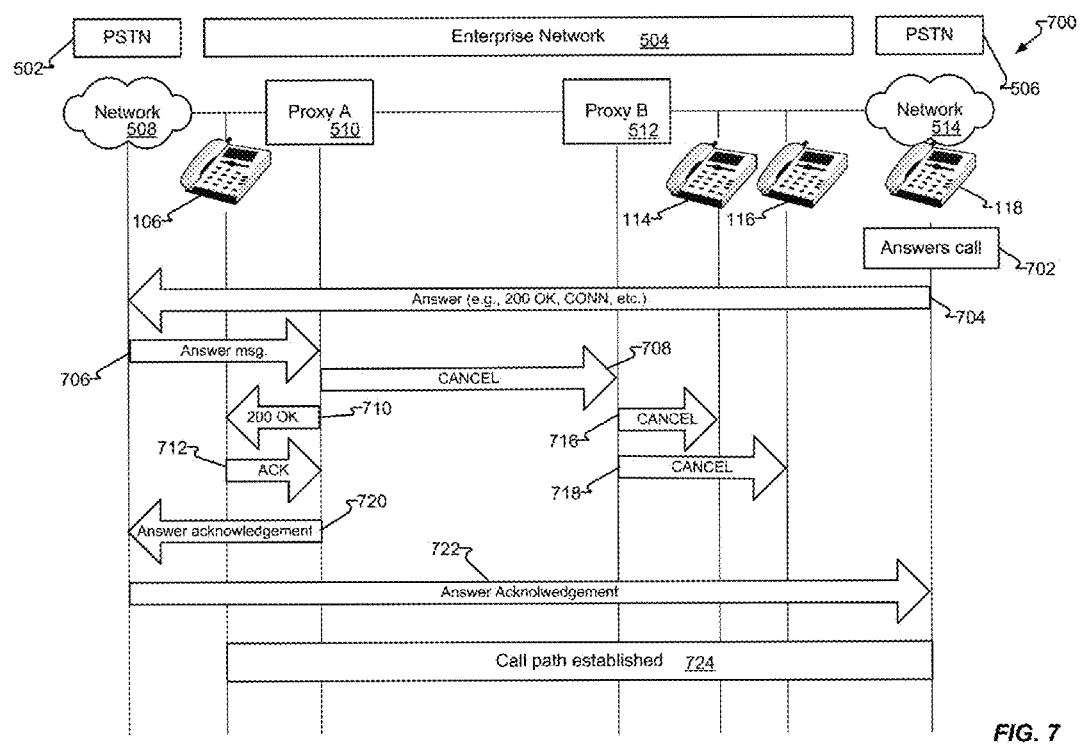
FIG. 7 depicts a third interaction in accordance with embodiments of the present disclosure.

FIG. 7 depicts interaction 700 in accordance with embodiments of the present disclosure. In one embodiment of the present disclosure, endpoints 114, 116, 118 are ringing and the call is answered via endpoint 118 receiving a forked call from the origination server (e.g., Call initiation 530 of FIG. 5). If destination endpoint 118, on network 514, answers the call (e.g., at block 702), then the call to destination endpoints 114, 116 will be terminated. In one embodiment of the present disclosure, network 514, sends message 704 to network 508 (e.g., "200 OK", CONNECT, etc.). Network 508 sends answered message 706 to proxy A 510. Proxy A 510 then sends cancel message 708 (e.g., CANCEL) to proxy B 512, which then sends cancel messages 716, 718 to destination endpoints 114, 116, respectively. Proxy A 510 also sends "200 OK" to endpoint 106 which responds with acknowledgment message 712. Proxy A 510 sends message 720 acknowledging the answer to network 508, which then forwards the acknowledgement as message 722 to network 514 and thereby establishes a call path in block 724 with ringing terminating on unanswered endpoints 114, 116.

Figure 8A:
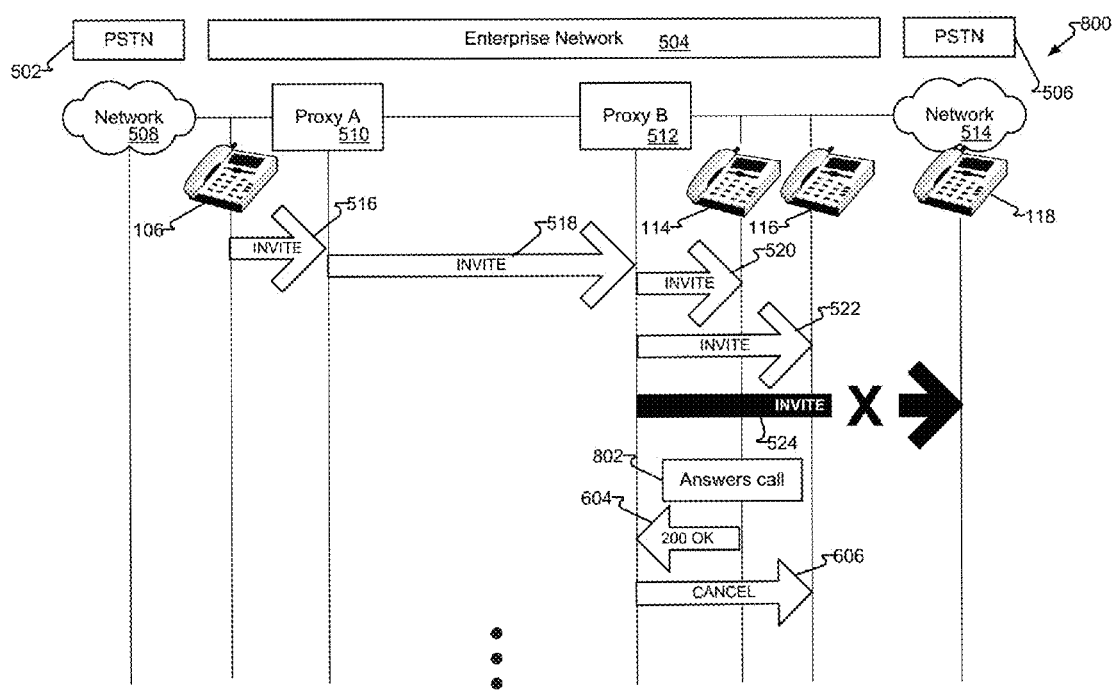
FIG. 8A depicts a first portion of a fourth interaction in accordance with embodiments of the present disclosure.
Figure 8B:
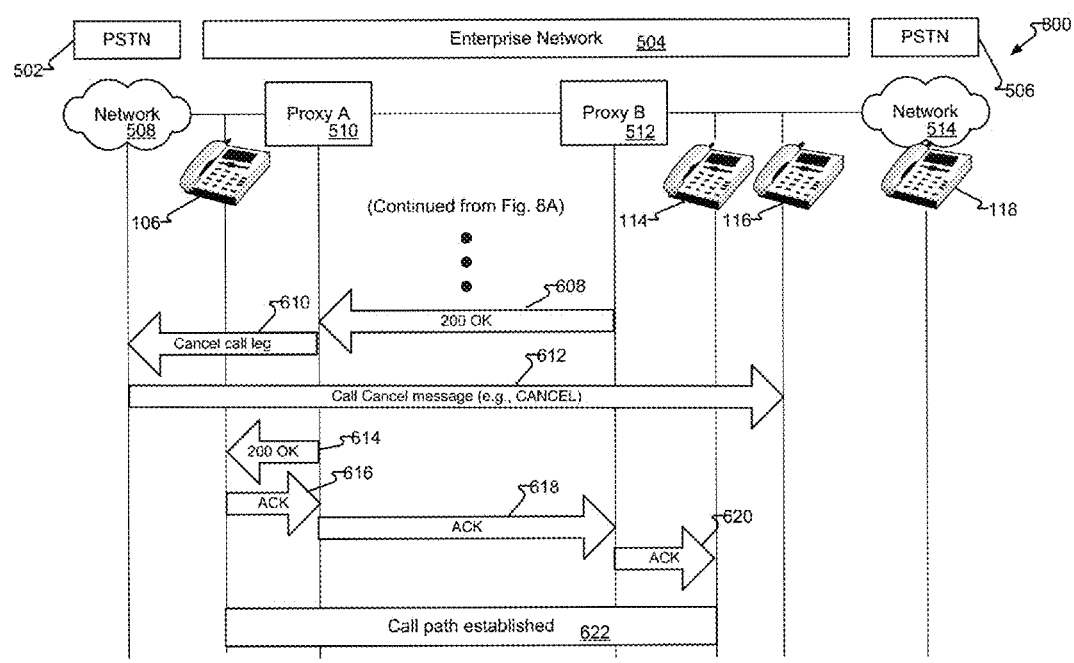
FIG. 8B depicts a second portion of a fourth interaction in accordance with embodiments of the present disclosure.

FIGS. 8A-8B depicts the portions of interaction 800 in accordance with embodiments of the present disclosure. In one embodiment, interaction 800 is performed upon a failed forked call to endpoint 118 and an answered forked call upon endpoint 114. Interaction 800 is performed when the failed forked call to endpoint 118 on network 514 and answer 802 occurring substantially at the same time as invite 524 to endpoint 118.

In another embodiment, a forked call to an endpoint associated with Proxy B 512, at least one of endpoint 114 and endpoint 116, fails. However, Proxy B 512 would be aware of such a failure via receipt of a failure message and may then respond accordingly as such conditions would likely be the result of an error or failure as Proxy B 512 should always be able to reach its associated endpoints, such as endpoints 114, 116. Proxy B 512 may become aware of the situation and respond accordingly, such as signaling an error reporting component and/or personnel. If endpoint 118 successfully receives and answers the call, endpoint 118 would then respond (e.g., "200 OK") to notify Proxy B 512.

However, endpoints outside of the domain of Proxy B 512 may be unreachable without returning any message of a failure. As a result, an invite message It is when the failed forked call is outside of the network, such as to PSTN 506 and/or network 514, or otherwise unreachable.

The specific messages provided are variously embodied. In one embodiment of the present disclosure destination endpoint 114 answers the call 802 such as a result of INVITE message 516, 518, 520 (see FIG. 5). Message 604 acknowledges the answering of the call, such as via "200 OK".

Proxy B 512 receives message 604 and proceeds to cancel the invite, such as INVITE message 522 (see FIG. 5), via cancel message 606. Message 608 is also an acknowledgment that the call has been answered in step 602, such as "200 OK". Proxy A 510 receives message 608 and initiates cancellation of the call to endpoint 118.

Network 508, such as in response to message 610, sends cancelation message 612 (e.g., CANCEL) to network 514 thereby causing INVITE message, such as invite message 524 (see FIG. 5) to be terminated. Proxy A 510 also sends message 614 (e.g., "200 OK") to origination endpoint 106, which responds with acknowledgement message 616 (e.g., ACK). Proxy A 510, in turn, sends ACK message 618 to proxy B 512, which in turn sends ACK message 620 to destination endpoint 114. As a result, call path 622 is established.

Figure 9:
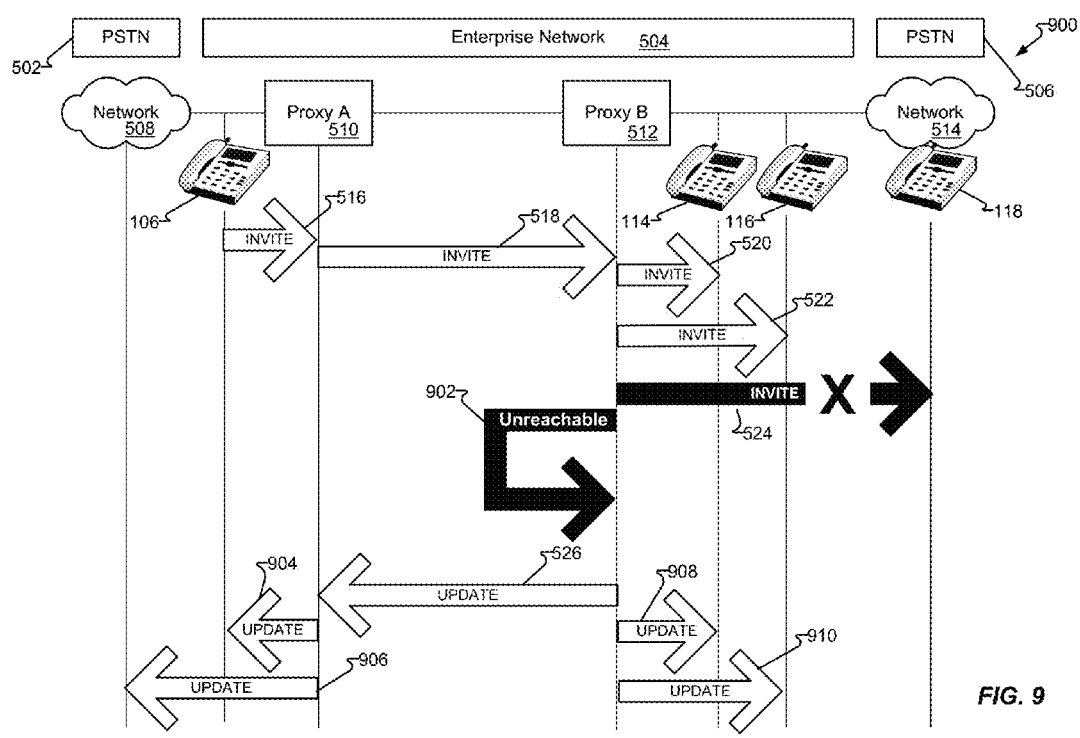
FIG. 9 depicts a fifth interaction in accordance with embodiments of the present disclosure.

FIG. 9 depicts interaction 900 in accordance with embodiments of the present disclosure. In one embodiment, endpoint 118 is unreachable and one or more devices are informed accordingly. In addition or alternatively to the placing of a forked call from Proxy A 510 (see FIG. 5), interaction 900 informs one or more components which, in turn, may be used to update records, alter error processing systems, notify destination user 104 or perform other action. As a benefit, systems may be aware of a probability or certainty that endpoint 118 is in an unreachable state and proceed accordingly.

In one embodiment, origination endpoint 106 sends invite 516 to proxy A 510. Proxy A 510 then sends invite 518 to proxy B 512. Proxy B 512 sends invite to destination endpoint 114 via invite 520 and to destination endpoint 116 via invite 522. Proxy B 512 sends invite 524 to destination endpoint 118, such as on PSTN 506; however, destination endpoint 118 is unreachable.

Proxy B 512 determines endpoint 118 is unreachable 902. As described herein, failure messages may be received whereby unreachable 902 is determined upon receipt of such a failure message. In another embodiment, Proxy B 512 may be determined by a timeout state, such as when no acknowledgement (e.g., "200 OK" or "180 RINGING") message is received from endpoint 118 within a previously determined period of time. In yet another embodiment, step 902 may determine that endpoint 118 is unreachable due to a network configuration that prohibits forking calls to be sent via a PSTN or otherwise dictates that forking calls not be made to endpoint 118. For example, step 902 may comprise accessing a database and a record therein to determine the rules for forking a call to endpoint 118. If such a forking call is prohibited, invite 524 may optionally be omitted and the unreachable 902 determination made preemptively.

Upon determining endpoint 118 is unreachable, Proxy B 512 may then be configured to notify one or more other components of the failure. As provided with respect to FIG. 5, update message 526 is sent to Proxy A 510. As Proxy A 510 is now aware of the failure, notification may be provided from Proxy A 510 to origination endpoint 106 via message 904 and/or network 508 via message 906, such as to make forward the notification to other components. For example, database 210 (see FIG. 2) may have a record indicating destination user 104 has inbound calls forked to endpoint 118, in addition to endpoints 114, 116. Endpoint 118 may be a specific location (e.g., home, work, vacation home, cellular phone, etc.) relied upon to access destination user 104. Destination user 104, when inaccessible via endpoint 118, may cause origination user 102 to perform another action in order to access destination user 104, such as send a text, email, or call another party likely to be able to access destination user 104 via a different communications channel.

In another embodiment, Proxy B may notify one or more of endpoints 114, 116 via messages 908, 910. As a benefit, destination user 104 may be notified that endpoint 118 is not reachable. Then, when destination user 104 has access to at least one of endpoints 114, 116, he or she will be aware of endpoint 118 being unreachable and may then make accommodations accordingly. For example, destination user 104 may know that forked calls will not reach endpoint 118 and may then chose to call a voicemail system associated with Proxy B 512 to determine if any calls have been missed or notify potential calling parties (e.g., origination user 102) of their inaccessibility or provide alternative means of being reached.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
    a destination server to manage communications between a network and a number of destination endpoints;
    a data storage device to maintain a call forking record associated with a subscriber of the destination server and identifying a plurality of destination endpoints to ring upon receiving a call for a designated one of the destination endpoints;
    wherein the destination server, upon receiving the call, accesses the call forking record and in accordance with the call forking record creates a plurality of forked calls attempting to ring each of the plurality of destination endpoints in parallel and determines that at least one of the plurality of destination endpoints is an unreachable destination endpoint due to an obstacle on a first call path between the destination server and the unreachable destination endpoint;
    wherein the destination server communicates with an originating server, associated with the origination of the call, over a network;
    wherein the destination server generates and sends a notification to the originating server associated with the call and wherein the notification comprises an address of the unreachable destination endpoint; and
    wherein the originating server receives the notification from the destination server and, in response to the received notification, creates an originating server forked call to the unreachable endpoint, the originating server forked call designating the address of the unreachable destination endpoint, and wherein a second call path between the originating server and the unreachable endpoint omits the obstacle.

2. The system of claim 1, wherein the destination server forwards the call to the plurality of destination endpoints that have not been determined to be the unreachable destination endpoint.

3. The system of claim 1, wherein the unreachable destination endpoint is associated with a failure notification received in response to the destination server placing the plurality of forked calls to the plurality of destination endpoints and receiving a failure notification in response to one of the plurality of forked calls.

4. The system of claim 1, wherein each of the forked calls are initiated using a SIP INVITE message.

5. The system of claim 1, wherein the destination server designates one of the destination endpoints as an answered endpoint, upon receiving an answered signal therefrom, and terminate each of the plurality of forked calls other than the one designated as the answered endpoint.

6. The system of claim 1, further comprising:
    wherein the destination server designates one of the destination endpoints providing an answered signal as an answered endpoint and terminate each of the plurality of forked calls other than the one of the forked calls associated with the answered endpoint and send an answered notification to the originating server; and
    wherein the originating server receives the answered notification and terminate the originating server forked call.

7. The system of claim 1, wherein originating server receives an answered signal from the unreachable endpoint and, in response to the answered signal, notify the destination server to terminate the plurality of forked calls.

8. The system of claim 1, wherein the originating server and the destination server are a single communications server.

9. The system of claim 1, wherein the unreachable destination endpoint is an endpoint governed by an entity known to prohibit call forking.

10. A method, comprising:
    accessing a call forking record associated with a subscriber of a destination server, the call forking record identifying a plurality of destination endpoints to ring upon receiving a call for a target endpoint associated with the subscriber;
    upon receiving the call, transmitting a notification to each of the plurality of destination endpoints in parallel;
    determining that at least one of the plurality of destination endpoints is unable to receive the notification transmitted to the at least one of the plurality of destination endpoints due to an obstacle on a first call path between the destination server and the at least one of the plurality of destination endpoints; and
    in response to the determining step, generating and sending a notification over a network to an originating server associated with the call that comprises an identifier of the destination endpoint that is unable to receive the notification transmitted to the at least one of the plurality of destination endpoints; and
    wherein the originating server receives the notification from the destination server and, in response to the received notification, creates an originating server forked call to the unreachable endpoint, the originating server forked call designating the identifier of the destination endpoint, and wherein a second call path between the originating server and the unreachable endpoint omits the obstacle.

11. The method of claim 10, further comprising:
    placing the plurality of forked calls;
    receiving a failure notification in response to placing one of the plurality of forked calls; and
    designating a one of the plurality of endpoints associated with the failure notification as the unreachable endpoint.

12. The method of claim 10, further comprising:
    placing the plurality of forked calls;
    receiving an answer notification in response to placing one of the plurality of forked calls; and terminating each of the plurality of forked calls other than the one of the plurality of forked calls associated with the answer notification.

13. The method of claim 10, further comprising:
upon the determining that the at least one of the plurality of destination endpoints is unable to receive the notification transmitted thereto, causing an originating server to create an originating forked call to the address of the unreachable destination endpoint having a second call path between the originating server and the unreachable destination endpoint that excludes the obstacle.

14. The method of claim 13, further comprising:
receiving an answer signal from one of the destination endpoints; and
causing each of the plurality of forked calls and the originating forked calls, other than the one of the plurality of forked calls and the originating forked call associated with the answer signal, to terminate.

15. A server, comprising:
a connection to a network and an originating endpoint;
wherein the server causes a call originating from the originating endpoint and designating a terminating endpoint to be forwarded to a destination server via the network and, in response to the forwarding, the server receiving an address associated with an unreachable endpoint, wherein the unreachable endpoint utilizes a first call path, between the destination server and the unreachable endpoint, comprising an obstacle; and
a call interface to create a forked call to the address associated with an unreachable endpoint and utilizing a second call path in parallel with the call originating from the originating endpoint;
wherein the server receives the notification from the destination server and, in response to the received notification, create an originating server forked call to the unreachable endpoint, the originating server forked call designating the address associated with an unreachable endpoint, and wherein a second call path between the server and the unreachable endpoint omits the obstacle.

16. The server of claim 15, wherein the call interface is configured to, upon receiving an answer signal from the address, notify the destination server of the received answer signal.

17. The server of claim 15, wherein the call interface is configured to, upon receiving an answer signal from the destination server, terminate the forked call.

18. The server of claim 15, wherein the server comprises the destination server and wherein the forked call to the address comprises an address of the unreachable endpoint associated with the second call path.

19. The server of claim 18, wherein the destination server creates a plurality of forked calls in response to receiving the call and the call being associated with a plurality of destination endpoints for a subscriber of the destination server.

20. The server of claim 15, wherein the unreachable endpoint is an endpoint governed by an entity known to prohibit call forking.

* * * * *

UNITED STATES PATENT AND TRADEMARK OFFICE
CERTIFICATE OF CORRECTION

PATENT NO.         : 9,948,777 B2
APPLICATION NO.    : 14/702849
DATED              : April 17, 2018
INVENTOR(S)        : Basavraj Ghuli and Dinesh Mude Page 1 of 1

It is certified that error appears in the above-identified patent and that said Letters Patent is hereby corrected as shown below:

At Column 14, Line 5, please delete "create" and insert --creates-- therein.

Signed and Sealed this
Second Day of October, 2018

Andrei Iancu
*Director of the United States Patent and Trademark Office*